W. W. PHILLER.

Wheel-Cultivator

No. 59,643

Patented Nov. 13, 1866.

Witnesses:
Alex T. Roberts
Wm. J. McNamaa

Inventor:
W. W. Philler
per Munn & Co.
Attorneys.

UNITED STATES PATENT OFFICE.

W. W. PHILLER, OF PORT BYRON, ILLINOIS.

IMPROVEMENT IN CULTIVATORS.

Specification forming part of Letters Patent No. 59,643, dated November 13, 1866.

*To all whom it may concern:*

Be it known that I, W. W. PHILLER, of Port Byron, in the county of Rock Island and State of Illinois, have invented a new and Improved Cultivator and Stalk-Cutter; and I do hereby declare that the following is a full, clear, and exact description thereof, which will enable others skilled in the art to make and use the same, reference being had to the accompanying drawings, forming part of this specification, in which—

Figure 1:
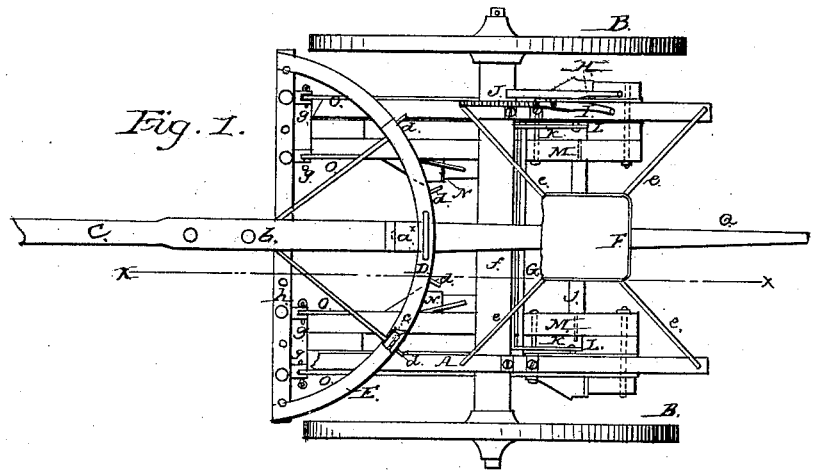
Figure 2:
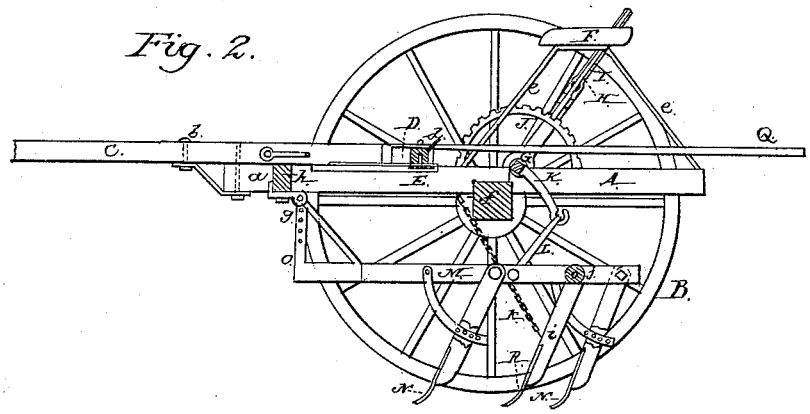
Figure 3:
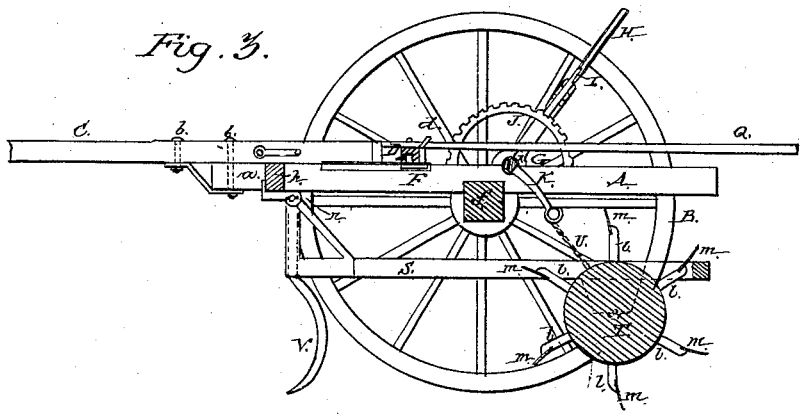

Figure 1 is a plan or top view of my invention; Fig. 2, a side sectional view of the same, taken in the line $xx$, Fig. 1; Fig. 3, a side sectional view of the same with the stalk-cutting device attached.

Similar letters of reference indicate like parts.

This invention relates to a new and improved device for cultivating or plowing corn and marking the ground for planting the same.

The invention consists in a novel construction and arrangement of parts, as hereinafter fully shown and described, whereby the desired work may be done expeditiously and in a perfect manner.

A represents a rectangular frame, which is mounted on two wheels, B B, and C is the draft-pole, which is attached to the front end of a bar, $a$, in the frame A by a bolt, $b$, the draft-pole being allowed to turn or work freely on said bolt.

To the rear end of the draft-pole there is attached a curved or segment bar, D, in which friction-wheels $c$ are fitted, said wheels bearing on a curved bar, E, secured to the front part of the frame A, and serving as a way or track for the wheels $c$. The segment-bar D has foot-pieces $d$ attached for the driver to press his feet against in order to guide machine to the right or left, the pivoted draft-pole being designed to effect this result.

F is the driver's seat, attached to supports $e$ on the frame A, and G is a shaft which is fitted in the frame A, just back of the axle $f$, and has a lever, H, attached to one end of it, said lever having a catch, I, secured to it to engage with a notched semicircular bar, J, on the frame A and retain the lever H and also the shaft G at the point or position required.

The shaft G has two arms, K K, projecting from its rear side, one near each end. The outer ends of these arms K K have the upper ends of rods or links L connected to them, the lower ends of the rods or links being secured in the rear parts of frames M M, to which the plows N are attached. The front ends of these plow-frames have metal standards O attached to them, and the upper ends of these standards are connected by pivot-bolts $g$ to the under side of the front cross-bar $h$ of the frame A, and it will be seen that by actuating the lever H the plows N may be adjusted higher or lower, so as to penetrate the earth the required depth, and also be raised entirely out of the earth when desired. The machine therefore may be guided to the right or left, so that the plows may conform to the sinuosities of the rows of plants, by operating against the rear end of the draft-pole with the feet, and the plows raised and lowered by adjusting the lever H with the hand, the driver effecting these results from his seat F. The friction-wheels $c$ admit of the draft-pole being readily turned or adjusted, as they obviate a great deal of friction.

In case the driver prefers walking to riding, I attach a bar or lever, Q, to the rear end of the draft-pole, said bar or lever extending out to the rear of the machine, so that it may be readily actuated by the driver behind the same. The lever H is also accessible from behind the machine.

When the device is used as a cultivator for preparing the ground a central plow, R, is attached, the standard $i$ of which is secured to a shaft, $j$, which has its bearings in the sides of the frames M M. The standard $i$ is connected by a chain, $k$, with the bar $a$ in the frame A, as shown in Fig. 2. When the device is used as a corn-plow or cultivator the central plow is detached.

S, Fig. 3, is a rectangular frame, in which a cylinder, T, is placed, said cylinder having radial arms $l$ projecting from it at each end, and to these arms cutters $m$ are attached, said cutters being parallel with the axis of the cylinder. The front end of the frame S is connected by pivots $n$ to the under side of the front cross-bar $h$ of the frame A in the same way as the plow-frames M M, the latter of course being detached when the frame S is applied. The rear part of the frame S is connected by chains U U with the arms K K of the shaft G, and hence said cutters may be raised above the surface of the ground when required. As the machine is drawn the cutters $m$ cut the stalks into pieces of suitable length, and, in order to bring lodged stalks within the action of the cutters $m$, I attach pendent hooks V, as shown in Fig. 3.

When the device is used as a cultivator or stalk-cutter a rigid draft-pole is required, and this can be obtained by inserting a bolt, $a^*$, through the rear end of the draft-pole.

Having thus described my invention, what I claim as new, and desire to secure by Letters Patent, is—

1. The pivoted draft-pole C, provided at its rear end with a curved or segment bar, D, having friction rollers or wheels $c$ inserted within it, and working or resting upon a semi-circular way or track, E, on the frame A, substantially as and for the purpose set forth.

2. The bar or lever Q, attached to the rear end of the draft-pole C, substantially in the manner as and for the purpose set forth.

W. W. PHILLER.

Witnesses:
  C. A. MARTIN,
  J. M. ARMSTRONG.